(12) United States Patent
Thomas et al.

(10) Patent No.: US 11,916,907 B2
(45) Date of Patent: Feb. 27, 2024

(54) FEDERATED SECURITY FOR MULTI-ENTERPRISE COMMUNICATIONS

(71) Applicant: Sophos Limited, Abingdon (GB)

(72) Inventors: Andrew J. Thomas, Oxfordshire (GB); Moritz Daniel Grimm, Bruchsal (DE); Thomas Rolf-Werner Eckert, Ludwigshafen (DE); Kenneth D. Ray, Seattle, WA (US)

(73) Assignee: Sophos Limited, Abingdon (GB)

( * ) Notice: Subject to any disclaimer, the term of this patent is extended or adjusted under 35 U.S.C. 154(b) by 405 days.

(21) Appl. No.: 16/924,141

(22) Filed: Jul. 8, 2020

(65) Prior Publication Data

US 2022/0014522 A1 Jan. 13, 2022

(51) Int. Cl.
*H04L 9/40* (2022.01)

(52) U.S. Cl.
CPC ...... *H04L 63/0892* (2013.01); *H04L 63/0218* (2013.01); *H04L 63/0263* (2013.01); *H04L 63/0876* (2013.01); *H04L 63/0884* (2013.01)

(58) Field of Classification Search
CPC ............. H04L 63/0892; H04L 63/0218; H04L 63/0263; H04L 63/0876; H04L 63/0884; H04L 63/0823; H04L 63/166; H04L 63/10; H04L 63/02
See application file for complete search history.

(56) References Cited

U.S. PATENT DOCUMENTS

| | | | |
|---|---|---|---|
| 5,826,014 A | 10/1998 | Coley et al. | |
| 7,562,389 B1* | 7/2009 | Goyal | H04L 63/0227 713/153 |
| 8,161,547 B1* | 4/2012 | Jennings | H04L 63/1441 726/22 |
| 2007/0143408 A1* | 6/2007 | Daigle | H04L 51/04 709/206 |
| 2008/0301794 A1* | 12/2008 | Lee | H04L 63/102 726/11 |
| 2010/0095361 A1* | 4/2010 | Wang | H04L 63/0471 709/228 |
| 2014/0282816 A1* | 9/2014 | Xie | H04L 67/06 726/1 |
| 2017/0134956 A1* | 5/2017 | Radpour | H04W 12/08 |
| 2019/0124042 A1* | 4/2019 | Thomas | G06F 21/45 |
| 2019/0312839 A1 | 10/2019 | Grimm et al. | |

(Continued)

FOREIGN PATENT DOCUMENTS

WO WO-2022010970 1/2022

OTHER PUBLICATIONS

ISA/EP, "PCT Application No. PCT/US21/40618 International Search Report and Written Opinion dated Oct. 1, 2021", 12 pages.

(Continued)

*Primary Examiner* — Amie C. Lin
(74) *Attorney, Agent, or Firm* — Strategic Patents, P.C.

(57) ABSTRACT

Where a single networked security service supports multiple enterprises, this security service can operate as a shared source of trust so that security devices associated with one enterprise can provide authenticated, policy-based management of computing devices associated with another enterprise. For example, an enterprise firewall can advantageously manage network access for a new device based on a shared and authenticated relationship with the networked security service.

19 Claims, 7 Drawing Sheets

(56) References Cited

U.S. PATENT DOCUMENTS

2019/0319945 A1 10/2019 Levy et al.
2020/0162431 A1* 5/2020 Goldschlag ......... H04L 61/4511

OTHER PUBLICATIONS

ISA/EP, "PCT Application No. PCT/US21/40618 International Preliminary Report on Patentability dated Jan. 20, 2023", 9 pages.

* cited by examiner

FEDERATED SECURITY FOR MULTI-ENTERPRISE COMMUNICATIONS

FIELD

The present disclosure relates to multi-enterprise communications, and more specifically to federated security for multi-enterprise communications.

BACKGROUND

A variety of tools exist for managing security threats within an enterprise, and controlling the devices and users having access to enterprise resources. However, there remains a need for systems that support management of access by users from one enterprise network to the resources of another, separately managed enterprise network.

SUMMARY

Where a single networked security service supports multiple enterprises, this security service can operate as a shared source of trust so that security devices associated with one enterprise can provide authenticated, policy-based management of computing devices associated with another enterprise. For example, an enterprise firewall can advantageously manage network access for a new device based on a shared and authenticated relationship with the networked security service.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Figure 1:
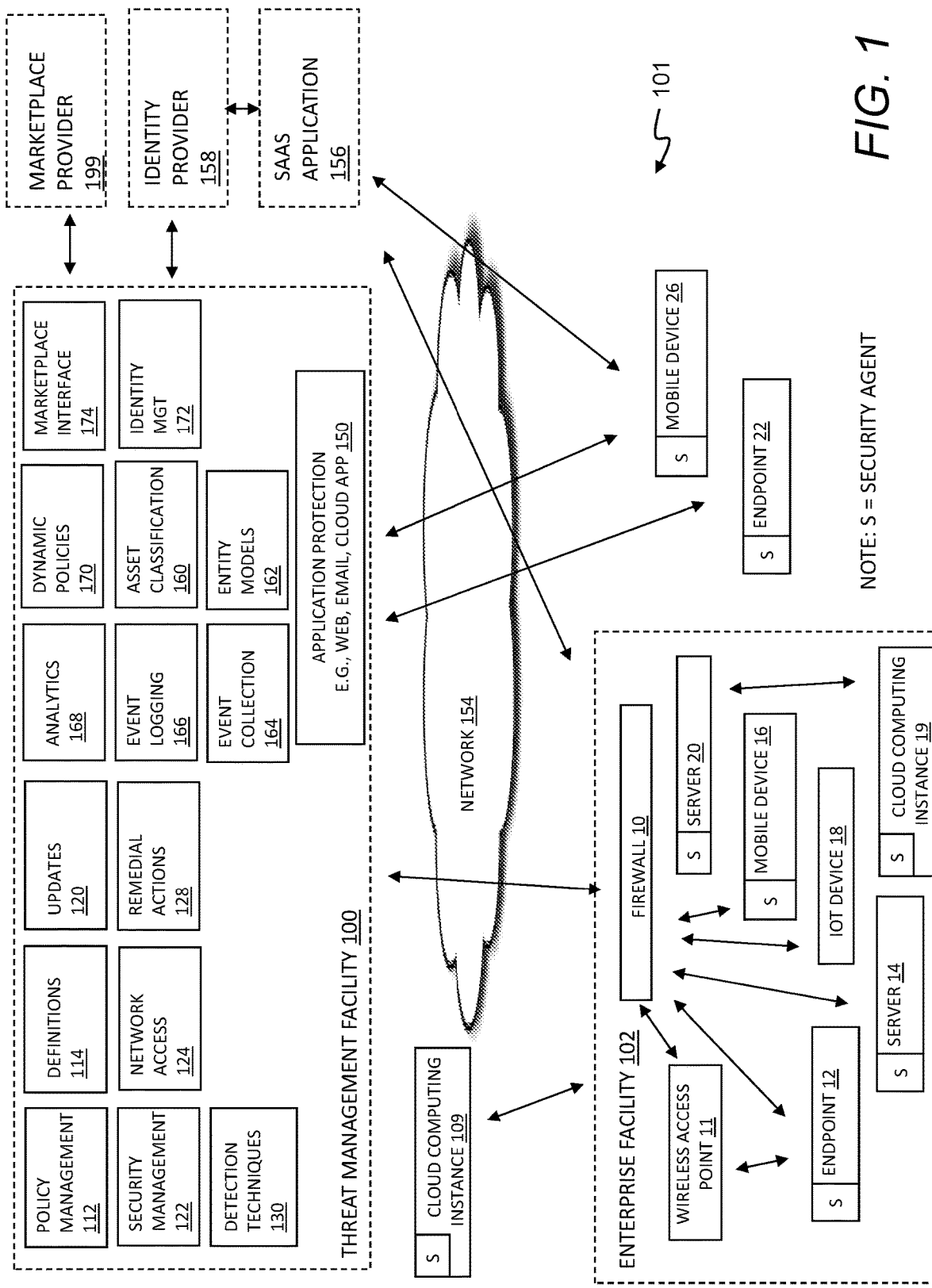
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 9, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 92, update facility 90, definitions facility 114, network access rules facility 94, remedial action facility 98, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 92.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 92 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 92 may provide malicious code protection to a compute instance. The security management facility 92 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 9, in a wireless access point 11 or firewall 10, as part of application protection 150 provided by the cloud, and so on.

In an embodiment, the security management facility 92 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 9, in a wireless access point 11 or firewall 10, as part of application protection 150 provided by the cloud, and so on.

In an embodiment, security management facility 92 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 9, in a wireless access point 11 or firewall 10, as part of application protection 150 provided by the cloud, and so on.

In an embodiment, the security management facility 92 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 9, in a wireless access point 11 or firewall 10, as part of application protection 150 provided by the cloud, e.g., from the threat management facility 100 or other network resource(s).

In an embodiment, the security management facility 92 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 9, in a wireless access point 11 or firewall 10, as part of application protection 150 provided by the cloud, and so on.

In an embodiment, the security management facility 92 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 9, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 90 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 92 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 92 for enforcement.

In embodiments, the threat management facility 100 may provide configuration management as an aspect of the policy management facility 112, the security management facility 92, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 9, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 90). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 90, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 90, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 92 may scan an outgoing file and verify that the outgoing file is permitted to be transmitted according to policies. By checking outgoing files, the security management facility 92 may be able discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 98. Aspects of the network access facility 94 may be provided, for example, in the security agent of the endpoint 9, in a wireless access point 11, in a firewall 10, as part of application protection 150 provided by the cloud, and so on.

In an embodiment, the network access facility 94 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 92, the remedial action facility 98 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
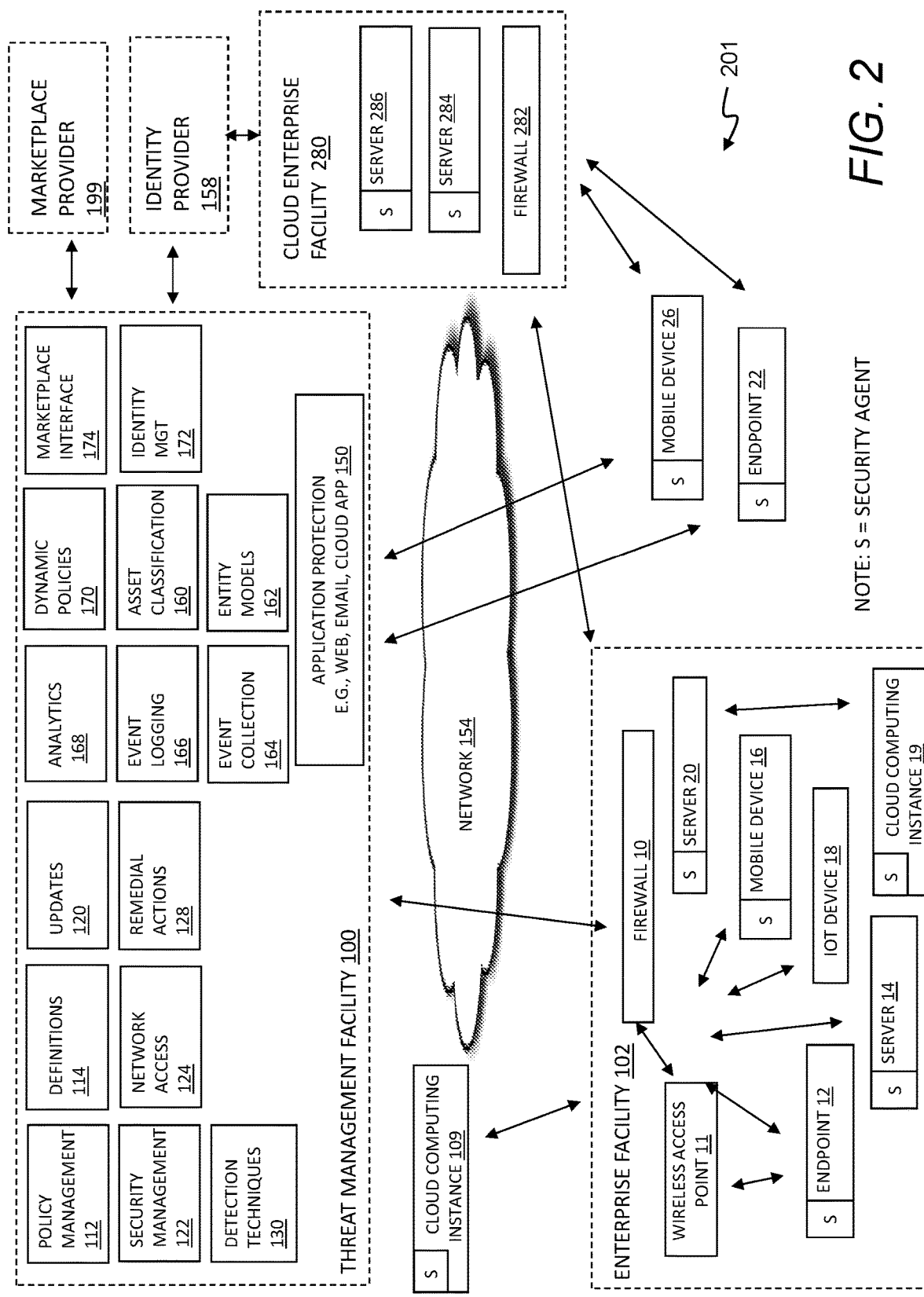
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
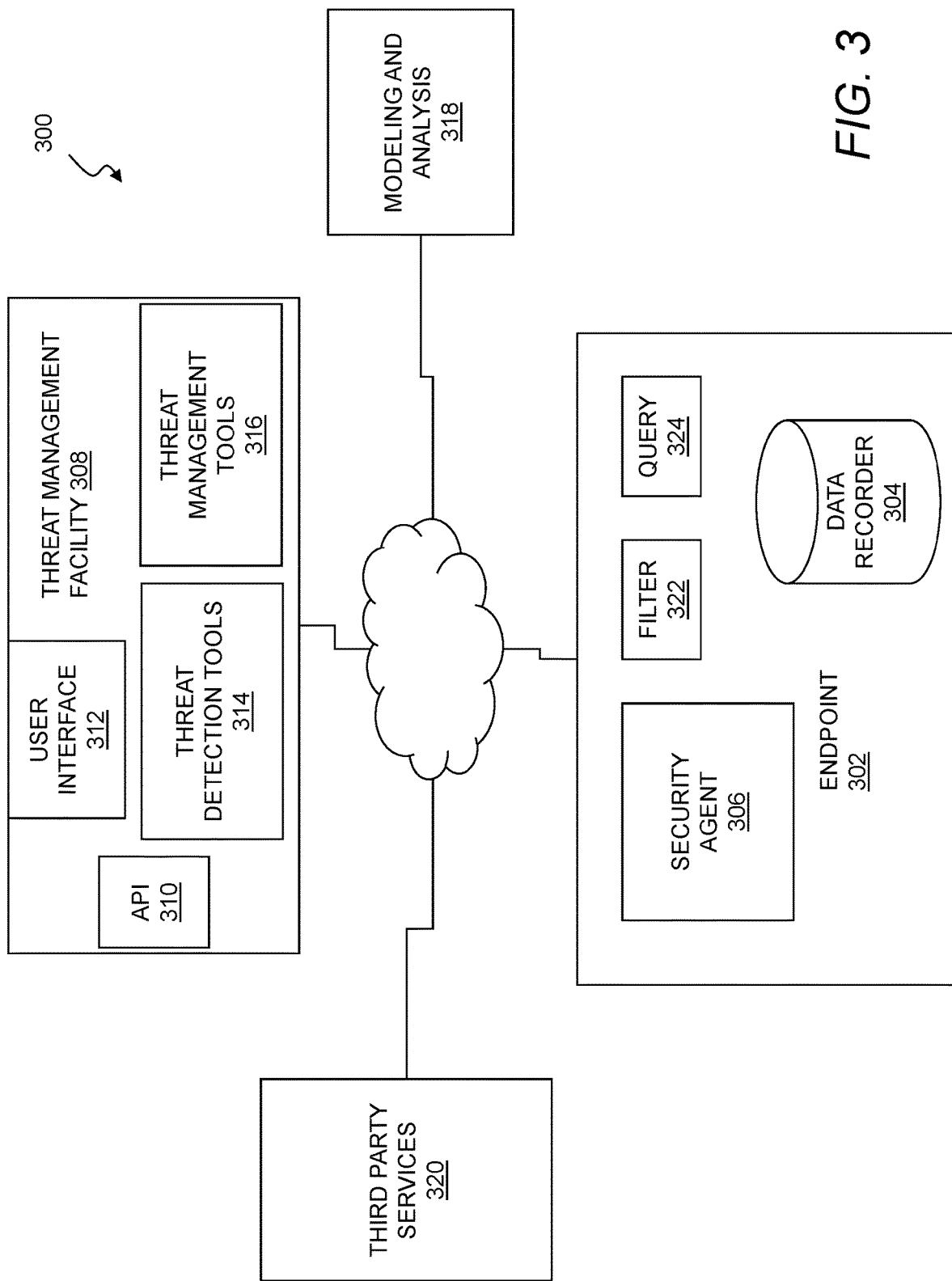
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
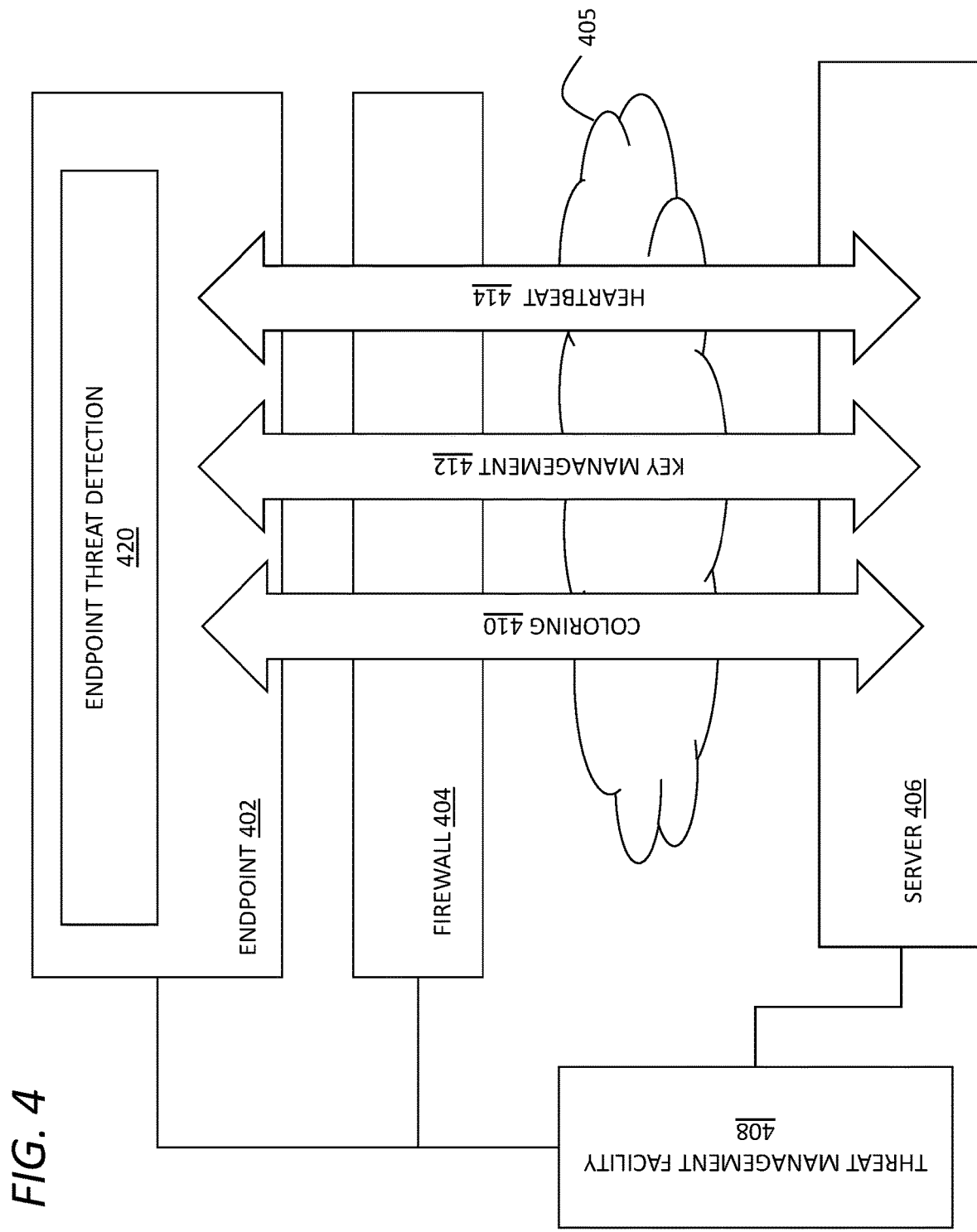
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule. In one aspect, a heartbeat may include a secure heartbeat that is cryptographically secured and/or authenticatable using any suitable techniques. In this manner, and endpoint 402 may reliably assert an identity and/or health status, and the threat management facility 408 may authenticate the identity and/or health status to facilitate secure and reliable management of the endpoint 402 and other endpoints within an enterprise network system.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
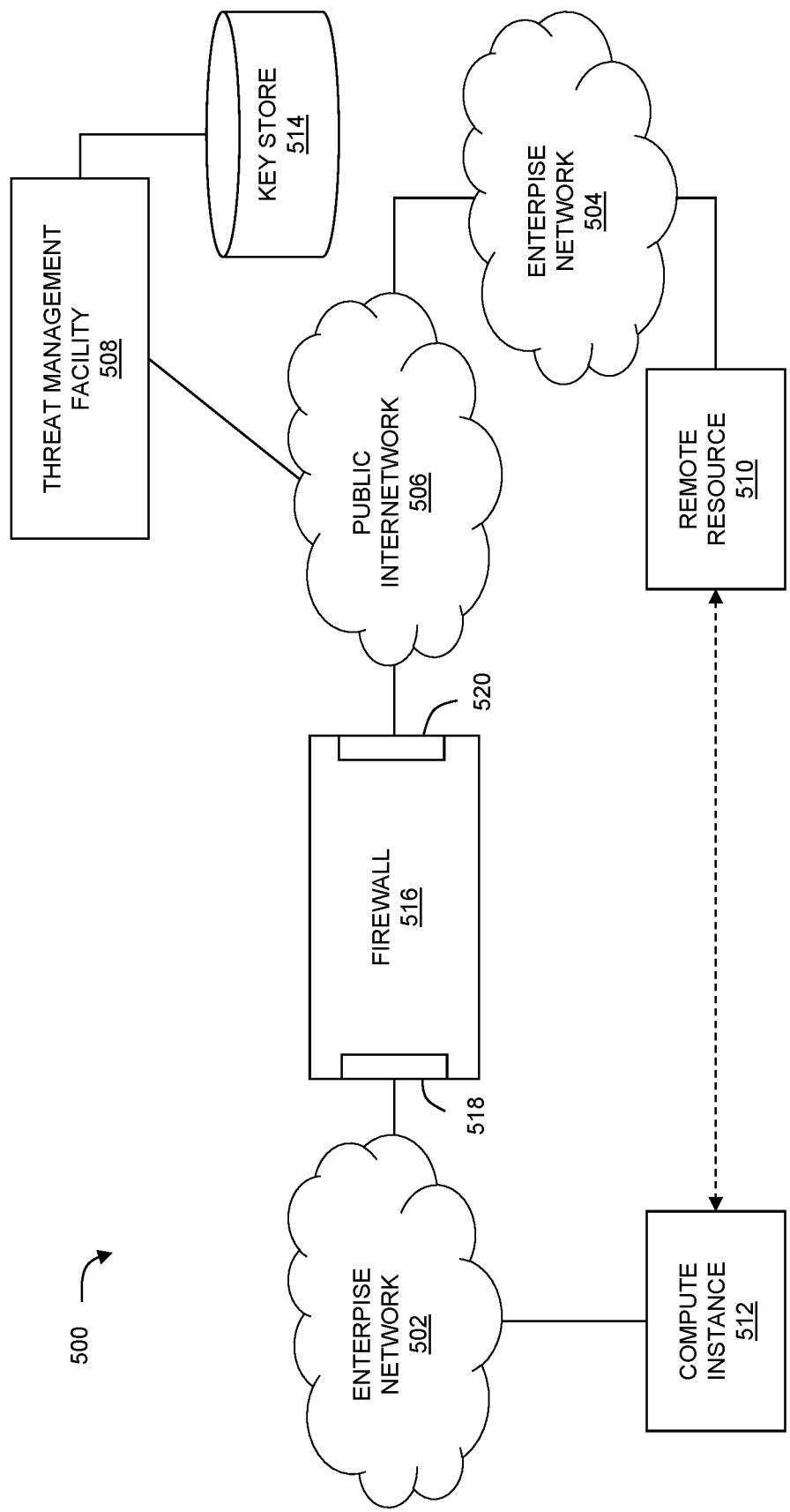
FIG. 5 shows a system using federated security.

FIG. 5 shows a system using federated security. In general, the system 500 may include a first enterprise network 502, a second enterprise network 504, a public internetwork 506, a threat management facility 508, a remote resource 510, and a compute instance 512. The threat management facility 508 may have a key store 514 (or may control or otherwise have access to a remotely managed key store 514). A firewall 516 may include a first network interface 518 and a second network interface 520 that coupling the first enterprise network 502 to the public internetwork 506 (through the firewall 516).

The first enterprise network 502 and the second enterprise network 504 may be any of the enterprise networks described herein. In general, it is contemplated that these networks are not affiliated with one another, e.g., that they are independently operated by separate commercial enterprises, and that they are physically and logically separated from one another. However, this is not strictly required. The two networks may, for example share cloud resources, communications or network resources, and the like. The two networks may also or instead be operated by separate but affiliated enterprises such as with separate subsidiaries of a larger commercial entity. More generally, while generally depicted as two enterprise networks 502, 506 managed by the threat management facility 508, the architecture may also or instead more generally include one or more data networks, which may include any arrangement of managed and/or unmanaged (by the threat management facility 508) networks, provided that a firewall (or a gateway or other network device) associated with a first enterprise is positioned along a network path to manage activity by a compute instance associated with a second enterprise. In a wide variety of such topologies, the threat management facility may advantageously control the applicable firewall rules based on authenticated relationships with each of the two separate enterprises.

In general, the public internetwork 506 may be any of the public networks or internetworks described herein including the Internet, cellular communications infrastructure, and so forth.

The threat management facility 508 may include a remote threat management facility coupled to the enterprise networks 502, 504 (and the firewall 516, etc.) through the public internetwork 506 as depicted. The threat management facility 508 may also or instead include local threat management facilities deployed within either or both of the enterprise networks 502, 504, or some combination of local and remote resources. In general, the threat management facility 508 may be configured to provide security services for each of the first enterprise network 502 and the second enterprise network 504. The threat management facility 508 may use a variety of cryptographic techniques to authenticate or otherwise verify the identity of managed devices such as the firewall 516 of the first enterprise network 502 and the compute instance 512 of the second enterprise network 504. For example, the association between the compute instance 512 and an enterprise (which may generally be an enterprise associated with the first enterprise network 502 or the second enterprise network 504, depending on the particular configuration and the relative access path by the compute instance 512) may be verified by a signed certificate provided by the threat management facility 508 to the compute instance 512 for presentation to the firewall 516. In another aspect, the threat management facility is configured to verify the association between the compute instance 512 and an enterprise (or an enterprise network associated with the enterprise) using a certificate signed by the compute instance 512 with an asymmetric private key.

The threat management facility 508 may also incorporate more general security features into this verification process. For example, the threat management facility 508 may be configured to assess a health state of the compute instance, e.g., using any of the techniques described herein, and to conditionally authorize network access by the compute instance 512 through the firewall 516 according to the health state of the compute instance 512. This conditional authorization may use the network access policies of the first enterprise network 502, the second enterprise network 504, or some combination of these. In one aspect, the threat management facility 508 may use a heartbeat, such as a secure heartbeat that is secured using any suitable cryptographic techniques to authenticate the compute instance 512, and/or to assess a security status of the compute instance 512. The identity and security status of the compute instance 512, subject to any appropriate verification, may be used in turn to determine whether and subject to what rules the compute instance 512 may communicate through the firewall 516.

The compute instance 512 may be coupled to the first enterprise network 502, while being associated with (e.g., managed by) the second enterprise network 504. The compute instance 512 may more specifically be coupled through the first enterprise network 502 to the first network interface 518 of the firewall. As described herein, where the first enterprise network 502 and the second enterprise network 504 are managed entirely or in part by a single, external threat management facility 508 that is trusted by both networks, then the threat management facility 508 may be used to facilitate access by an endpoint of one network to the connectivity and resources of the other network, pursuant to any policies by such network for use of resources by an outside, but known and verifiable entity. For example, when the firewall 516 detects the compute instance 512 associated with an external network, the firewall 516 may permit the compute instance 512 to couple through the second network interface 520 to the threat management facility 508, or the firewall 516 may itself connect to the threat management facility 508, in order to authenticate or otherwise confirm the identity of the compute instance 512 and the relationship of the compute instance 512 with the second enterprise network 504. With this information reliably confirmed, the threat management facility 508 may control the firewall 516 or permit the firewall 516 to manage network activity by the compute instance 512 according to any suitable policy for network usage by known, third-party endpoints. Thus for example, the threat management facility 508 may be configured to cryptographically verify an association between the compute instance 512 and the second enterprise network 504 as a condition for access by the compute instance 512 to the public internetwork 506 through the firewall 516. In one aspect, the threat management facility may cryptographically verify an association between the compute instance 512 and the second enterprise network 504 using a transport layer security handshake protocol to authenticate the compute instance 512. However, it will be understood that any protocol or combination of protocols suitable for cryptographic authentication as contemplated herein may also or instead be used.

While the compute instance 512 may use this authentication procedure to access a remote resource 510 in an associated second enterprise network 504 to which the compute instance 512 belongs, it will be understood that the compute instance 512 may more generally seek to access any resource outside the first enterprise network 502. For example, this may include third party cloud storage resources, third party cloud computing resources, and the like, in addition to other content generally available on the public internetwork 506. The amount and type of traffic permitted for this connection by the compute instance 512 may be regulated by the firewall 516 according to any suitable policy including without limitation network policies for the first enterprise network 502, network policies for the second enterprise network 504, or some combination of these, and/or any other policy provided by the threat management facility 508, the firewall 516, or one of the enterprise networks 502, 504, or otherwise applicable to the context in which the compute instance 512 is requesting access to outside resources through the firewall 516 and the public internetwork 506.

The key store 514, which may be directly managed by the threat management facility 508, or managed as a third-party trust authority, certificate authority, or other remote cryptographic resource, may generally store and/or manage cryptographic material such as certificates, public/private key pairs, symmetric key pairs, and so forth used by the threat management facility to authenticate compute instances and other network resources, to sign communications, control logins, and so forth.

The firewall 516 may, for example, include any of the firewalls described herein. The firewall 516 may be present in a gateway between networks, or any other location within a network that might lie on a path between a resource such as the remote resource 510 associated with the second enterprise network 504 and the compute instance 512 seeking to access the remote resource 510 through the firewall 516. In general, the firewall 516 may be include or be coupled to a first network interface 518 and a second network interface 520. These network interfaces 518, 520 will generally provide software and/or hardware interfaces between the firewall 516 and any networks connected thereto. This may include software and/or hardware to form physical connections, manage protocol layers, and so forth within any computer networks coupled to the firewall. For example, the network interfaces 518, 520 may include hardware interfaces such as a network interface controller or network interface device, a software interface such as a network socket, a protocol interface such as a networking port, and so forth. The network interfaces 518, 520 may usefully connect to any suitable networks or network resources. For example, the firewall may be coupled to the first enterprise network 502 through the first network interface 518, and further connected to a second network such as a public internetwork 506 through the second network interface 520. In this manner, the firewall 516 may regulate traffic passing between the first network interface 518 and the second network interface 520 using any suitable rules, policies, and so forth.

The firewall 516 may also or instead manage access (e.g., by the compute instance 512) to specific external resources coupled to the public internetwork 506, and or internal resources within the first enterprise network 502. Thus for example, the firewall 516 may permit the compute instance 512 to access a remote resource 510 associated with the second enterprise network 504 to which the compute instance belongs, while access to other resources coupled to the public internetwork 506 but unassociated with the second enterprise network 504. Alternatively, the firewall 516 may apply network policies of the first enterprise network 502 to general network traffic by the compute instance 512, e.g., by applying whitelists, applying reputation-based rules, and so forth, while permitting unregulated access by the compute instance 512 to the remote resource 510 if it is trusted by the second enterprise network 504.

Figure 6:
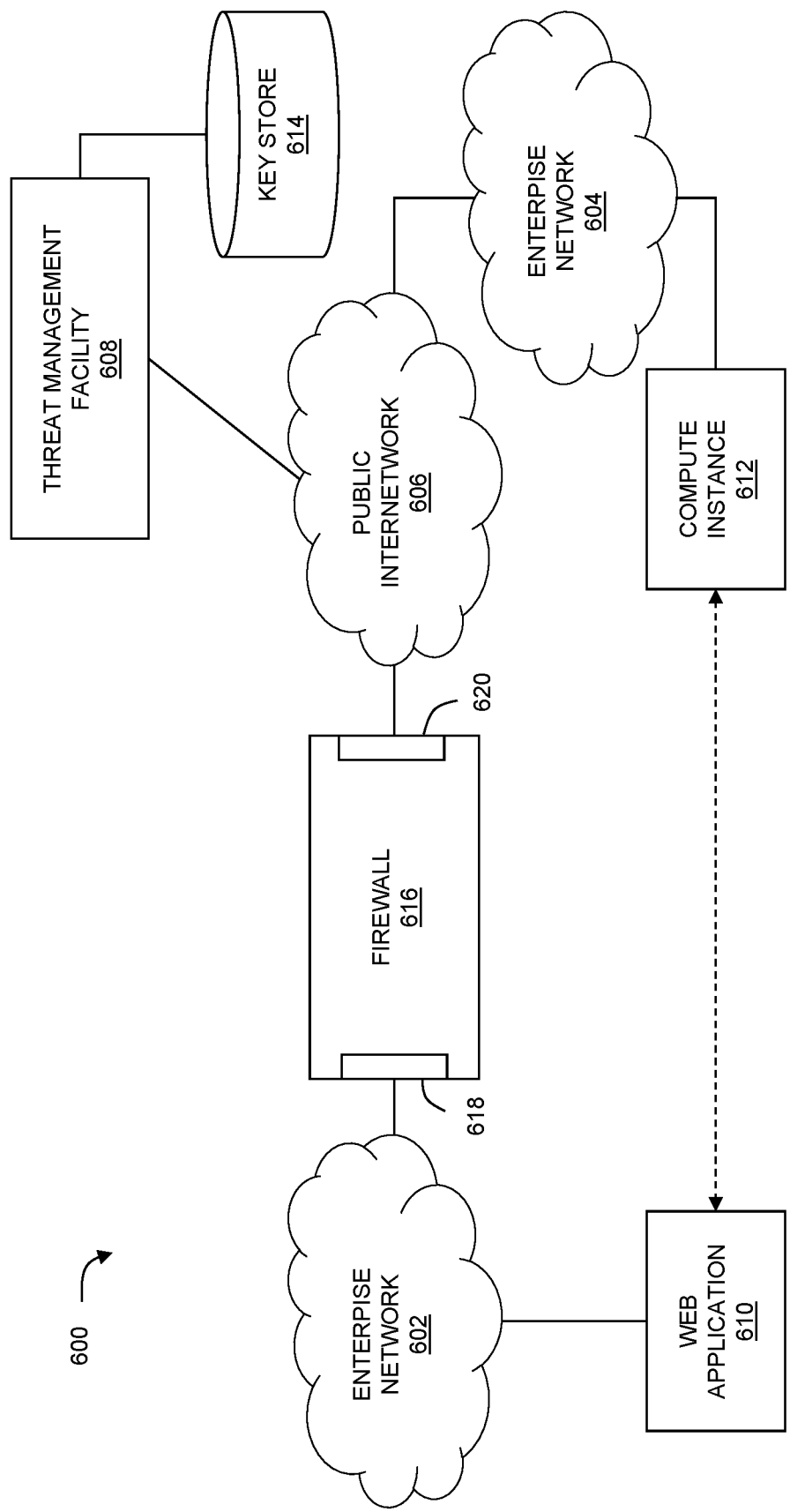
FIG. 6 shows a system using federated security.

FIG. 6 shows a system using federated security. In general, the system 600 may include a first enterprise network 602, a second enterprise network 604, a public internetwork 606, a threat management facility 608, a web application 610, and a compute instance 612. The threat management facility 608 may have a key store 614 (or may control or otherwise have access to a remotely managed key store 614). A firewall 616 may include a first network interface 618 and a second network interface 620 that coupling the first enterprise network 602 to the public internetwork 606 (through the firewall 616). The system 600 may be the system 500 described above with reference to FIG. 5, with differences as noted below.

The first enterprise network 602 and the second enterprise network 604 may be any of the enterprise networks described herein. In general, it is contemplated that these networks are not affiliated with one another, e.g., that they are independently operated by separate commercial enterprises, and that they are physically and logically separated from one another. However, this is not strictly required. The two networks may, for example share cloud resources, communications or network resources, and the like. The two networks may also or instead be operated by separate but affiliated enterprises such as with separate subsidiaries of a larger commercial entity. More generally, while generally depicted as two enterprise networks 602, 606 managed by the threat management facility 608, the architecture may also or instead more generally include one or more data networks, which may include any arrangement of managed and/or unmanaged (by the threat management facility 608) networks, provided that a firewall (or a gateway or other network device) associated with a first enterprise is positioned along a network path to manage activity by a compute instance associated with a second enterprise. In a wide variety of such topologies, the threat management facility may advantageously control the applicable firewall rules based on authenticated relationships with each of the two separate enterprises.

In general, the public internetwork 606 may be any of the public networks or internetworks described herein including the Internet, cellular communications infrastructure, and so forth.

The threat management facility 608 may include any of the threat management facilities described herein, including remote threat management facilities coupled to the enterprise networks 602, 604 through the public internetwork 606 (as depicted), local threat management facilities deployed within either or both of the enterprise networks 602, 604, or some combination of these. In general, the threat management facility 608 may be configured to provide security services for each of the first enterprise network 602 and the second enterprise network 604.

The web application 610 may include any web application, web service, or other remote resource or the like accessible by the compute instance 612 through the public internetwork 606. Alternatively, in configurations where the compute instance 612 of the second enterprise network 604 is directly and locally connected to the first enterprise network 602, e.g., through a router, wireless access point, or other connectivity resource of the enterprise network 602, the web application 610 may be accessible directly through the first enterprise network 602, with the connection managed, e.g., by the firewall 616 or any similar security resource. Using the systems and methods described herein, this web application 610 may be made available publicly, e.g., through the public internetwork 506, and the web application 610 may manage access by users associated with any entity or enterprise network associated with the threat management facility 508, provided, e.g. that the connecting entity/endpoint can provide a secure heartbeat or other satisfactory proof of identity, health status and the like to the web application 610 with reference to the threat management facility 508.

The compute instance 612 may be coupled to the second enterprise network 602, with which the compute instance 612 is associated. It will be understood that, while depicted as being coupled directly to the second enterprise network, the compute instance 612 should more generally be understood as being associated with the second enterprise network 604. Thus, while the compute instance 612 is associated with the second enterprise network 604 and subject to security and policy management according to the security infrastructure of the second enterprise network 604, the compute instance 612 may be coupled to the web application 610 or other remote resource of the first enterprise network 602 in any of a number of other manners. For example, the compute instance 612 may be coupled to the public internetwork 606 at a network location outside the second enterprise network 604 and the first enterprise network 602, or the compute instance 612 may be coupled to the first enterprise network 602 where the web application 610 co-located, but separated from the web application 610 within the first enterprise network 602 by the firewall 616, behind which the web application 610 is not generally not accessible to endpoints that are not associated with the first enterprise network 602. Under any of these configurations, the compute instance 612 of the second enterprise network 604 may use the services of the web application 610 of the first enterprise network 602 provided that the compute instance 612 and the firewall 616 managing the connection can be authenticated or otherwise verified by the threat management facility 608. This may include authentication or the like using any of the techniques describe herein, particularly in those instances where the threat management facility 608 is a remote threat management facility 608 that independently manages security for both of the enterprise networks 602, 604 as described herein.

The key store 614, which may be directly managed by the threat management facility 608, or managed as a third-party trust authority, certificate authority, or other remote cryptographic resource, may generally store and/or manage cryptographic material such as certificates, public/private key pairs, symmetric key pairs, and so forth used by the threat management facility to authenticate compute instances and other network resources, to sign communications, control logins, and so forth.

The firewall 616 may, for example, include any of the firewalls described herein. The firewall 616 may be present in a gateway between networks, or any other location within a network that might lie on a path between a resource such as the web application 610 associated with the first enterprise network 602 and the compute instance 612 seeking to access the web application 610 through the firewall 616. In general, the firewall 616 may be include or be coupled to a first network interface 618 and a second network interface 620 such as those described herein. The firewall 616 may also or instead manage availability (e.g., by the web application 610) to specific external entities coupled to the public internetwork 606, and or internal resources within the first enterprise network 602. Thus for example, the firewall 616 may permit the compute instance 612 associated with the second enterprise network 604 to access the web application 610 associated with the first enterprise network 602 while restricting access to other entities coupled to the public internetwork 606 but unassociated with the second enterprise network 604. Alternatively, the firewall 616 may apply network policies of the first enterprise network 602 to general network traffic by the web application 610, e.g., by applying whitelists, applying reputation-based rules, and so forth, while permitting unregulated access by the compute instance 612 to the web application 610 if the compute instance 612 is trusted by the second enterprise network 604. In one aspect, the firewall 616 may include a web application firewall for the web application 610 or any other application server that is coupled with one of the enterprise networks 602, 604 and communicating with the public internetwork 606 through the web application firewall. In another aspect, the firewall 616 may retrieve a public key for the compute instance 612 in order to authenticate the compute instance 612, or traffic originating from the compute instance 612.

According to the foregoing, in one aspect, the system 600 may include a first network interface coupled through a first data network with a compute instance, the compute instance associated with a first enterprise; a second network interface coupled to a second data network; a firewall coupled to the first network interface and the second network interface, the firewall associated with a second enterprise different than the first enterprise; and a threat management facility coupled in a communicating relationship with the firewall, the threat management facility configured to provide security services for each of a first enterprise network of the first enterprise and a second enterprise network of the second enterprise, and the threat management facility further configured to verify an association between the compute instance and the first enterprise as a condition for access by the compute instance to the second data network through the firewall.

In one configuration, the first data network may be a public internetwork and the second data network may be the second enterprise network described above, where the system includes an application server in the second enterprise network configured to respond to network requests through the firewall from devices coupled to the public internetwork, and where the threat management facility is configured to verify the association between the compute instance and the first enterprise before authorizing access by the compute instance to the application server through the firewall. Numerous other configurations and arrangements are possible. For example, in another configuration, the first data network of this system may be the second enterprise network associated with the second enterprise of the firewall, where the second data network is a public internetwork, and where the threat management facility is configured to verify the association between the compute instance and the first enterprise before authorizing access by the compute instance through the firewall to the public internetwork.

More generally, using these techniques, a variety of trusted guest or trusted external user configurations can be deployed and managed, provided that the guest (e.g., compute instance 616) and an enterprise network are both managed by a single, independent threat management facility, or alternatively, by a number of independent threat management facilities that agree to exchange trust information and/or share a trust authority in a manner that permits verification of both the compute instance and the enterprise so that the firewall can apply suitable firewall rules. For example, an enterprise may notify the threat management facility 608 that other enterprises managed by the threat management facility 608 can use the network resources of the enterprise provided the compute instance 612 of such a guest user meets certain minimum requirements. The threat management facility 608 may then serve as a trusted intermediary to broker the trust relationship between the enterprise and the compute instance 612, e.g., using the techniques described herein.

The relationship may be technologically managed using any protocol or combination of protocols that support the creation and management of a suitable trust relationship. This may be used to support automated guest policies, e.g., for any compute instances meeting certain requirements, or user-specific policies, e.g., where a guest is visiting a site for a tour, a meeting, or the like. A generic guest connection may be used to let a visitor connect and access the threat management facility 608 for authentication to the enterprise network. Upon successful verification, the compute instance 612 for the visitor may be transferred to the protected network for more general computing use. Similarly, a compute instance 612 may, upon detecting that it is in a remote environment, request a key from the threat management facility 608, or ask to establish a secure heartbeat with the threat management facility 608 in order to receive elevated access to the network. The policy for these trusted guests, e.g., external but authenticated and trusted users, may establish access privileges, resource allocations, and the like for an authenticated or trusted guest user.

Figure 7:
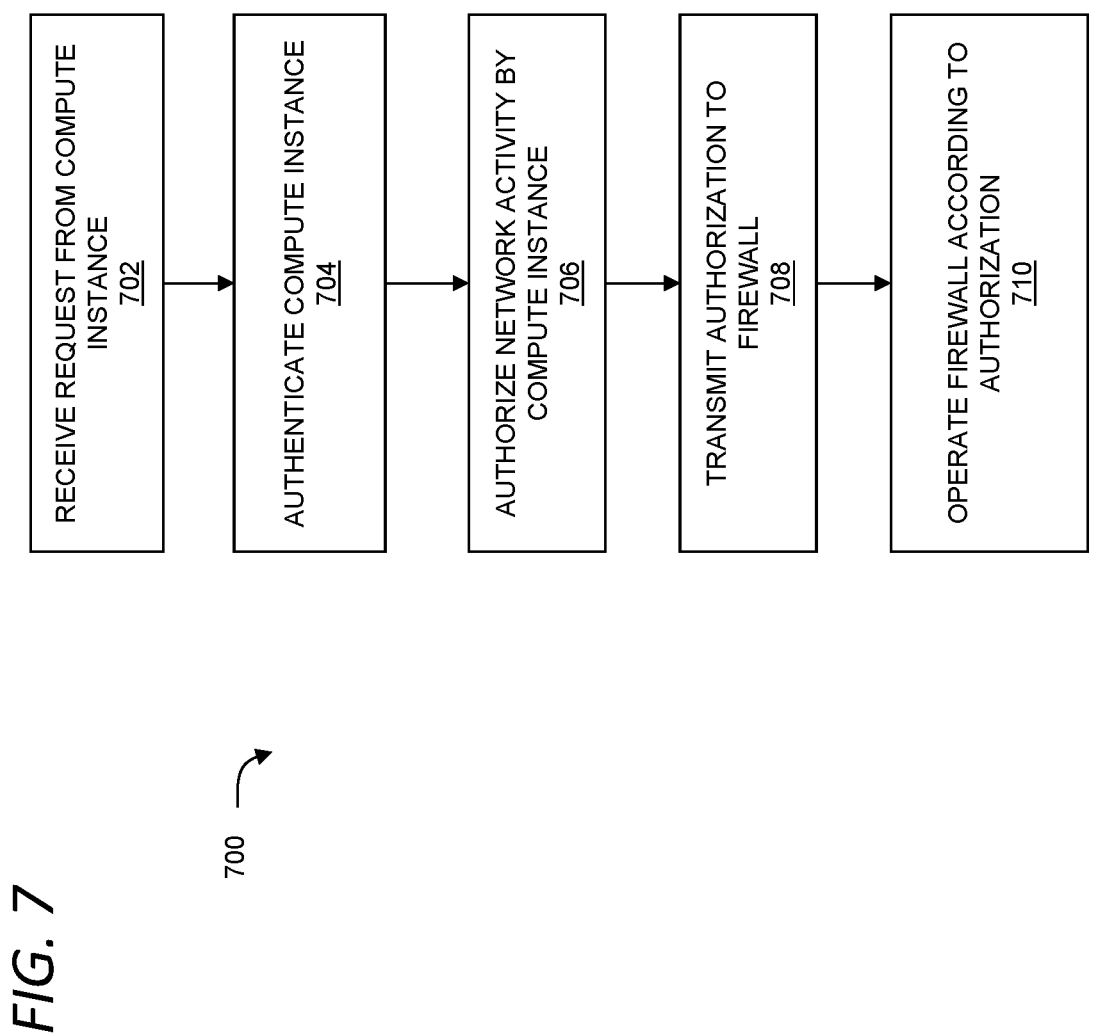
FIG. 7 shows a method for federated security of multi-enterprise networks.

FIG. 7 shows a method for federated security of multi-enterprise networks. The process 700 may be used, for example, in the systems described above to manage access by a compute instance from one enterprise to the resources of another enterprise.

As shown in step 702, the method 700 may begin with receiving a request from a compute instance. The request may be from a compute instance associated with a first enterprise network at a firewall or other network resource associated with a second enterprise network different than the first enterprise network. The request may, for example, be addressed to a network resource accessible through the firewall. The network resource may be a web application separated from a public network by a firewall. In one aspect, the compute instance is coupled to the second enterprise network of the firewall, and the compute instance requests access through the firewall to a remote resource on a public internetwork. In another aspect, the compute instance is coupled to the firewall through a public internetwork, and the compute instance requests access to a web application hosted through the firewall. As further described herein, the firewall may regulate access to the web application based on a verification of the relationship of the compute instance with the first enterprise network.

As shown in step 704, the method 700 may include authenticating the compute instance, e.g., with reference to a remote threat management facility that manages security for the first enterprise network and the second enterprise network. This may include verifying an association of the compute instance with the first enterprise network at a threat management facility. For example, a firewall or other resource of the first enterprise network may, upon detection of the compute instance, access the threat management facility to authenticate the compute instance, or may direct the compute instance to obtain a key, signature, certificate, or other information so that the compute instance can assert that it is managed by the threat management facility. In one aspect, verifying the association of the compute instance with the first enterprise network may include receiving a secure heartbeat from the compute instance at the threat management facility and cryptographically verifying information in the secure heartbeat. In another aspect, verifying the association of the compute instance with the first enterprise network includes authenticating the compute instance in a transport layer security handshake between the compute instance and the firewall. In another aspect, verifying the association of the compute instance with the first enterprise network includes authenticating the compute instance to a wireless access point for the second enterprise network using a four-way handshake.

In one aspect, the request from the compute instance may include a certificate signing request from the compute instance to the threat management facility. This certificate signing request may, for example, by signed by the compute instance with an asymmetric private key to assist the threat management facility in verifying the association between the compute instance and the enterprise network. The threat management facility may, in turn, sign this certificate signing request with its own private key (e.g., an asymmetric key from a public-private key pair used by the threat management facility) and return this signed certificate to the compute instance for use by the compute instance when asserting the association to other entities that also trust the threat management facility. More generally, any cryptographic technique or other technique for reliably authenticating the compute instance, or otherwise verifying that the compute instance is managed by the threat management facility, either with reference to the threat management facility or with reference to some other commonly trusted third party, may be used in the verifying step.

As shown in step 706, the method 700 may include authorizing network activity by the compute instance. For example, the threat management facility may authorize specific network activity, or may authorize the firewall to apply any desired local policies. This may for example, include a policy that is used for compute instances belonging to the first enterprise network or any policy that is used for compute instances belonging to the second enterprise network. This may also or instead include a policy for devices meeting a particular security profile, or a policy for trusted guests, e.g., a policy that is more restrictive than for local devices, but less restrictive than for unknown devices.

As shown in step 708, the method 700 may include transmitting the authorization to the firewall. As noted above, a number of different authentication techniques may be used. Where the firewall negotiates directly with the threat management facility, this may include transmitting the corresponding authorization directly to the firewall. Where the compute instance negotiates the authentication with the threat management facility, the compute instance may receive, and subsequently transmit to the firewall, a signature, certificate, or other verifiable assertion that the compute instance is associated with the second enterprise network. It will also be understood that where the firewall and the compute instance are managed by a common threat management facility that is shared by both enterprises, the firewall may advantageously receive the (cryptographically verifiable) association information for the compute instance from the external enterprise and any corresponding firewall policy information or rules for the local enterprise at the same time.

As shown in step 710, the method 700 may include operating the firewall according to the authorization from the threat management facility. For example, this may include, in response to the authorization, transmitting the request from the compute instance through the firewall to a network resource such as an external resource accessible through a public network outside the first enterprise network. Where the compute instance is verified by a firewall of the second enterprise network, operating the firewall according to the authorization may also or instead include applying a policy at the firewall that permits the compute instance to access a public network, access particular resources on the public network, access resources on the first enterprise network, and so forth. More generally, the firewall may apply any rules to restrict, allow, or otherwise regulate access to network resources through the firewall according to the identity of the compute instance and the association of the compute instance with the first enterprise network.

The above systems, devices, methods, processes, and the like may be realized in hardware, software, or any combination of these suitable for a specific application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
    a firewall coupled to a first network interface and a second network interface, the firewall directly associated with a first enterprise network and coupled to the first enterprise network through the first network interface, and the firewall coupled to a public internetwork through the second network interface;
    a compute instance belonging to a second enterprise network, the compute instance coupled through the first enterprise network to the first network interface of the firewall; and
    a threat management facility, external to the first enterprise network and the second enterprise network, coupled in a communicating relationship with the firewall through the public internetwork, wherein:
    the first enterprise network is independent from the second enterprise network, the threat management facility is configured to provide security services independently for authenticated users from each of the first enterprise network associated with the firewall and the second enterprise network associated with the compute instance, the threat management facility is configured to manage a security policy for the firewall, and the threat management facility is further configured to cryptographically authenticate a user of the compute instance, verify an association of the user of the compute instance with the second enterprise network, and based on authentication of the user with respect to the second enterprise network, operate the firewall directly associated with the first enterprise network to enable the compute instance belonging to the second enterprise network to access the public internetwork via the first enterprise network and through the first and second network interfaces and the firewall according to a policy for trusted guests.

2. The system of claim 1 wherein the threat management facility cryptographically verifies the association of the user of the compute instance with the second enterprise network using a transport layer security handshake protocol to authenticate the compute instance.

3. A system comprising:
- a first network interface coupled through a second enterprise network with a compute instance, the compute instance belonging to a first enterprise network of a first enterprise;
- a second network interface coupled to a public internetwork network;
- a firewall coupled to the first network interface and the second network interface, the firewall directly associated with the second enterprise network of a second enterprise different than the first enterprise and coupled to the second enterprise network through the first network interface, and the firewall coupled to the public internetwork through the second network interface; and
- a threat management facility, external to the first enterprise network and the second enterprise network, coupled in a communicating relationship with the firewall through the public internetwork, wherein:
- the first enterprise network is independent from the second enterprise network, the threat management facility is configured to provide security services independently for authenticated users from each of the first enterprise network of the first enterprise and the second enterprise network of the second enterprise, the threat management facility is configured to manage a security policy for the firewall, and the threat management facility is further configured to cryptographically authenticate a user of the compute instance, verify an association of the user of the compute instance with the first enterprise, and based on authentication of the user with respect to the first enterprise network, operate the firewall directly associated with the second enterprise network to enable the compute instance belonging to the first enterprise network to access the public internetwork via the second enterprise network and through the first and second network interfaces and the firewall according to a policy for trusted guests.

4. The system of claim 3 the system further comprising an application server in the second enterprise network configured to respond to network requests through the firewall from devices coupled to the public internetwork, wherein the threat management facility is configured to verify the association of the user of the compute instance with the first enterprise before authorizing access by the compute instance to the application server through the firewall.

5. The system of claim 3 wherein the threat management facility is configured to verify the association of the user of the compute instance with the first enterprise before authorizing access by the compute instance through the firewall to the public internetwork.

6. The system of claim 3 wherein the association of the user of the compute instance with the first enterprise is verified by a signed certificate provided by the threat management facility to the compute instance for presentation to the firewall.

7. The system of claim 3 wherein the association of the user of the compute instance with the first enterprise is verified by a signed certificate provided by the threat management facility to the firewall in response to a connection to the firewall initiated by the compute instance.

8. The system of claim 3 wherein the threat management facility is configured to assess a health state of the compute instance, and to conditionally authorize network access by the compute instance through the firewall according to the health state of the compute instance.

9. The system of claim 3 wherein the firewall is a web application firewall for an application server coupled to the second enterprise network and communicating with a public internetwork through the web application firewall.

10. The system of claim 3 wherein the threat management facility is a remote resource coupled to the firewall through a public internetwork.

11. The system of claim 3 wherein the threat management facility is configured to verify the association of the user of the compute instance with the first enterprise and to provide a cryptographically verifiable certificate of the association useable by the compute instance.

12. A computer program product comprising computer executable code embodied in a non-transitory computer readable medium that, when executing on one or more computing devices, performs steps of:
- receiving a request from a compute instance belonging to a first enterprise network at a firewall directly associated with a second enterprise network that is independent from the first enterprise network, the request received through the second enterprise network and addressed to a network resource coupled to a public internetwork separated from the second enterprise network by the firewall, the firewall coupled to the second enterprise network through a first network interface and coupled to the public internetwork through a second network interface, the compute instance coupled through the second enterprise network to the first network interface of the firewall;
- verifying an association of a user of the compute instance with the first enterprise network with a cryptographic authentication of the user of the compute instance at a remote threat management facility that is external to the first enterprise network and the second enterprise network and is coupled to the firewall through the public internetwork, wherein the remote threat management facility is configured to provide security services independently for a first plurality of authenticated users associated with the first enterprise network and for a second plurality of authenticated users associated with the second enterprise network and is configured to manage a security policy for the firewall;
- based on authentication of the user with respect to the first enterprise network and a policy for trusted guests, transmitting an authorization from the remote threat management facility to the firewall directly associated with the second enterprise network for the compute instance belonging to the first enterprise network to access the network resource coupled to the public internetwork via the second enterprise network and through the first and second interfaces and the firewall; and in response to the authorization, transmitting the request from the compute instance through the firewall of the second enterprise network to the network resource.

13. A method comprising:

receiving a request from a compute instance belonging to a first enterprise network at a firewall directly associated with a second enterprise network that is independent from the first enterprise network, the request received through the second enterprise network and addressed to a network resource coupled to a public internetwork separated from the second enterprise network by the firewall, the firewall coupled to the second enterprise network through a first network interface and coupled to the public internetwork through a second network interface, the compute instance coupled through the second enterprise network to the first network interface of the firewall;

verifying an association of a user of the compute instance with the first enterprise network with a cryptographic authentication of the user of the compute instance at a threat management facility that is external to the first enterprise network and the second enterprise network and is coupled to the firewall through the public internetwork, wherein the threat management facility is configured to independently provide security services for authenticated users from each of the first enterprise network associated with the compute instance and the second enterprise network associated with the firewall;

based on verifying the association of the user of the compute instance with the first enterprise network and a policy for trusted guests, transmitting an authorization from the threat management facility to the firewall directly associated with the second enterprise network for the compute instance belonging to the first enterprise network to access the network resource coupled to the public internetwork via the second enterprise network and through the first and second interfaces and through the firewall; and in response to the authorization, transmitting the request from the compute instance through the firewall of the second enterprise network to the network resource.

14. The method of claim 13 wherein the network resource is a web application separated from a public network by the firewall.

15. The method of claim 13 wherein the compute instance is coupled to the second enterprise network of the firewall, and the compute instance requests access through the firewall to a remote resource on a public internetwork.

16. The method of claim 13 wherein the compute instance is coupled to the firewall through a public internetwork, and the compute instance requests access to a web application hosted through the firewall.

17. The method of claim 13 wherein verifying the association of the compute instance with the first enterprise network includes receiving a secure heartbeat from the compute instance at the threat management facility and cryptographically verifying information in the secure heartbeat.

18. The method of claim 13 wherein verifying the association of the compute instance with the first enterprise network includes authenticating the compute instance in a transport layer security handshake between the compute instance and the firewall.

19. The method of claim 13 wherein verifying the association of the compute instance with the first enterprise network includes authenticating the compute instance to a wireless access point for the second enterprise network using a four-way handshake.

* * * * *